Patented Jan. 17, 1939

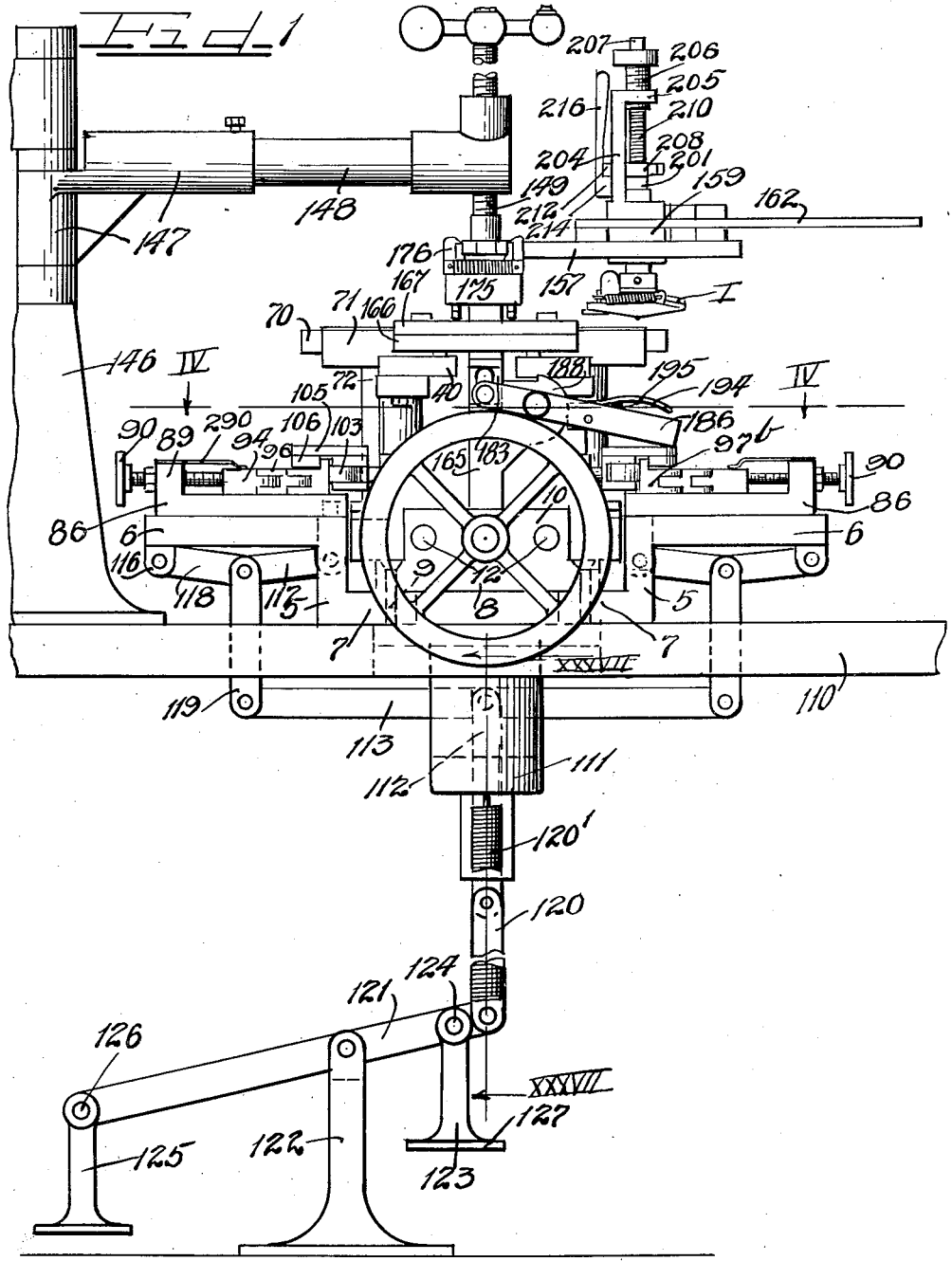

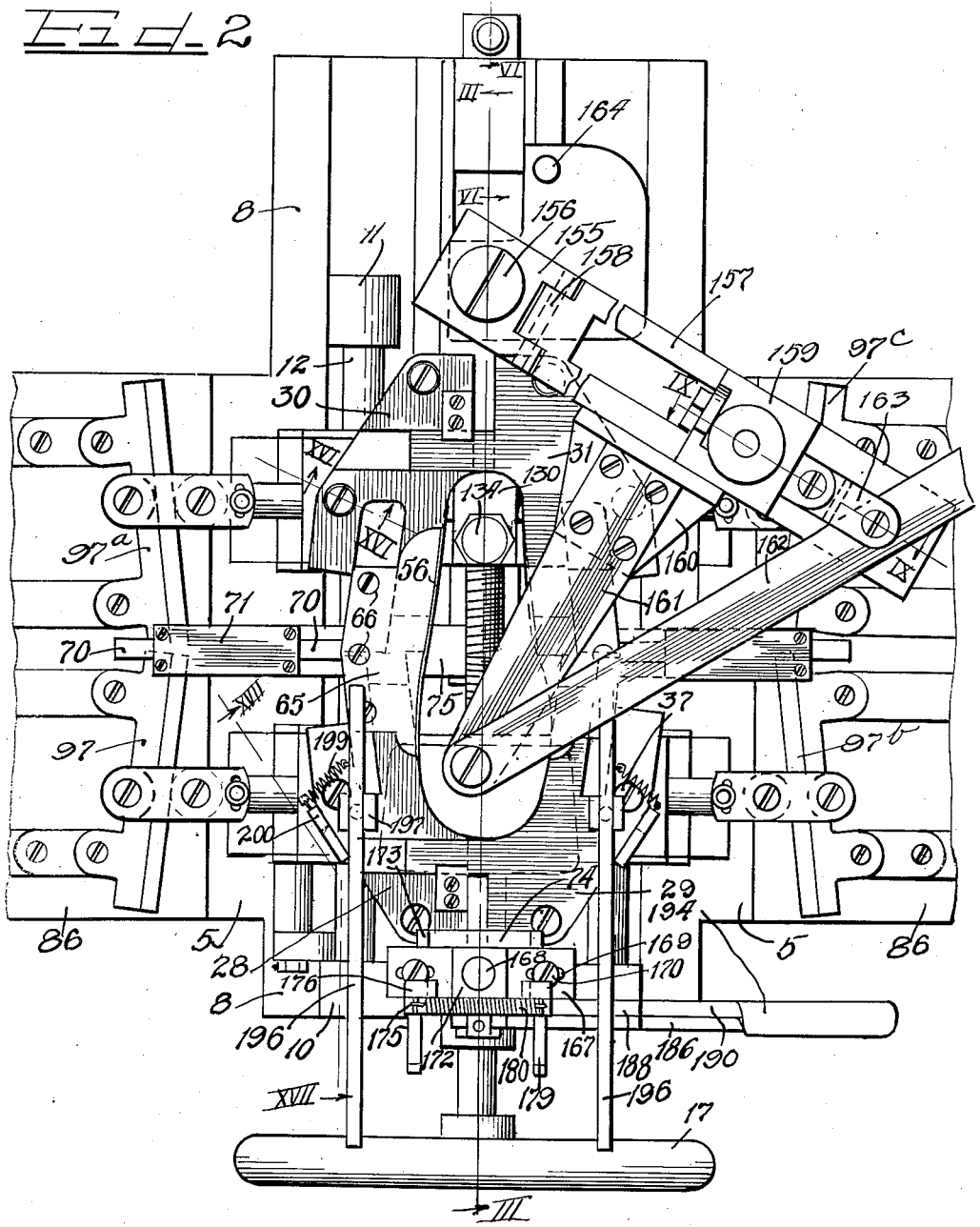

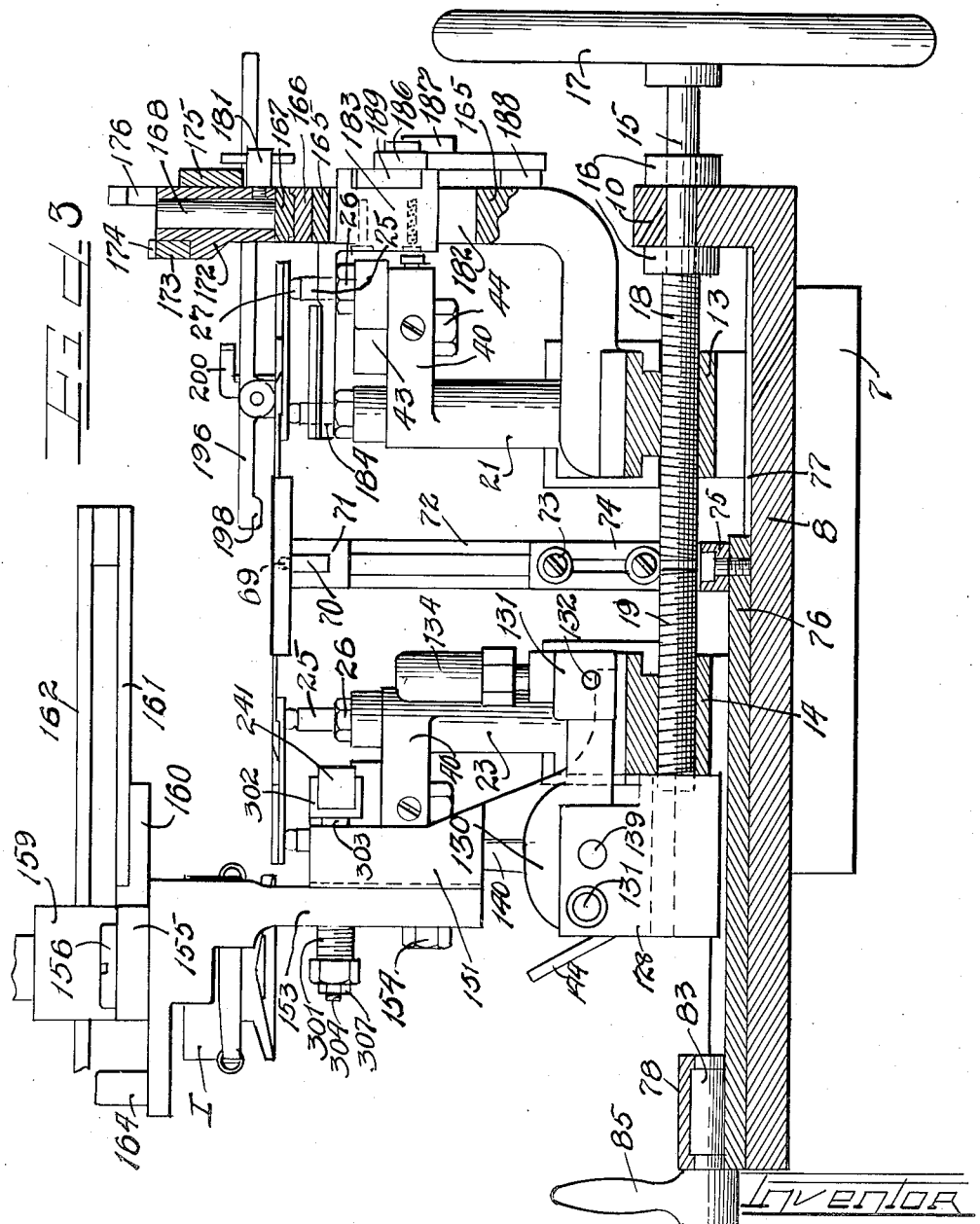

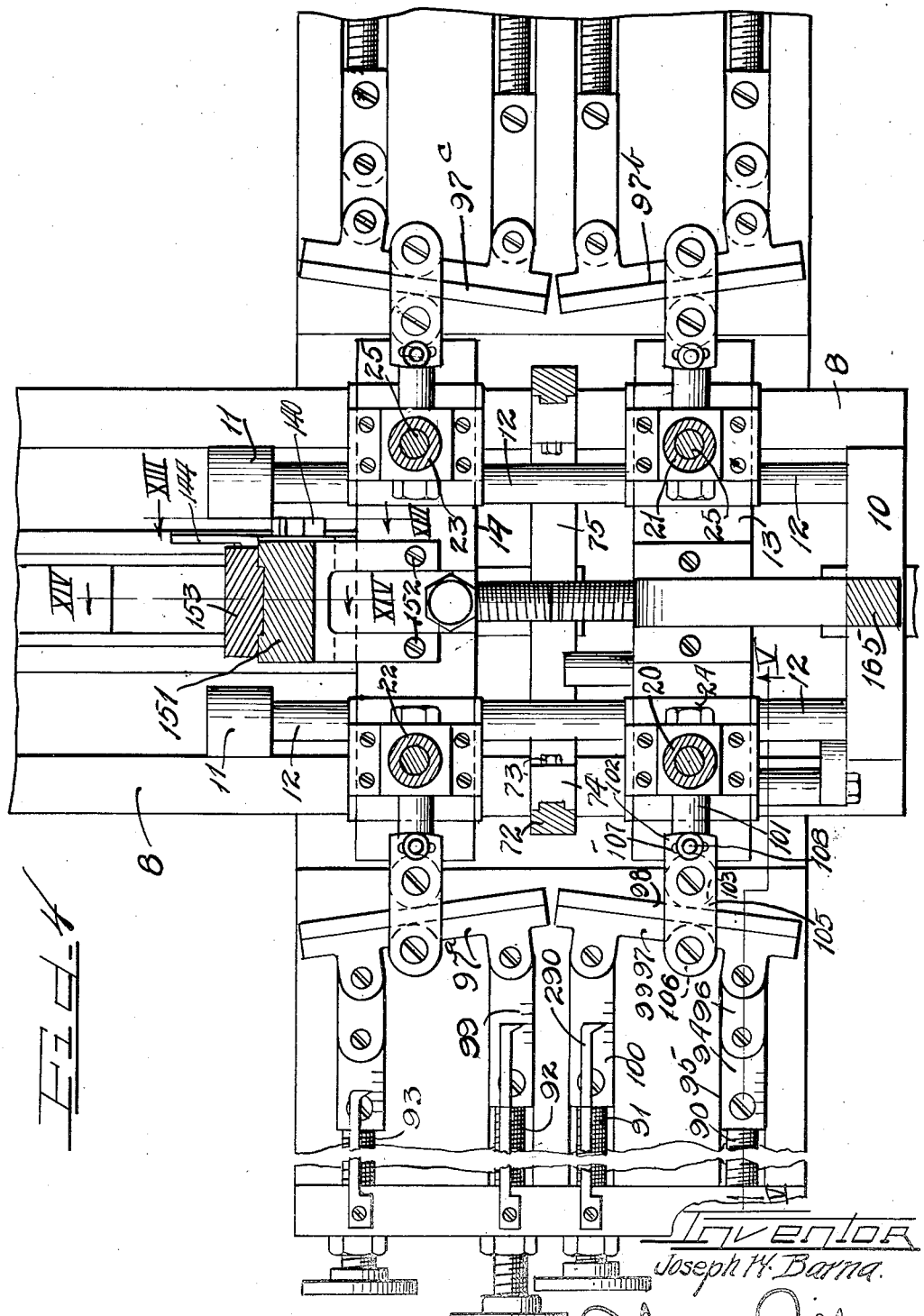

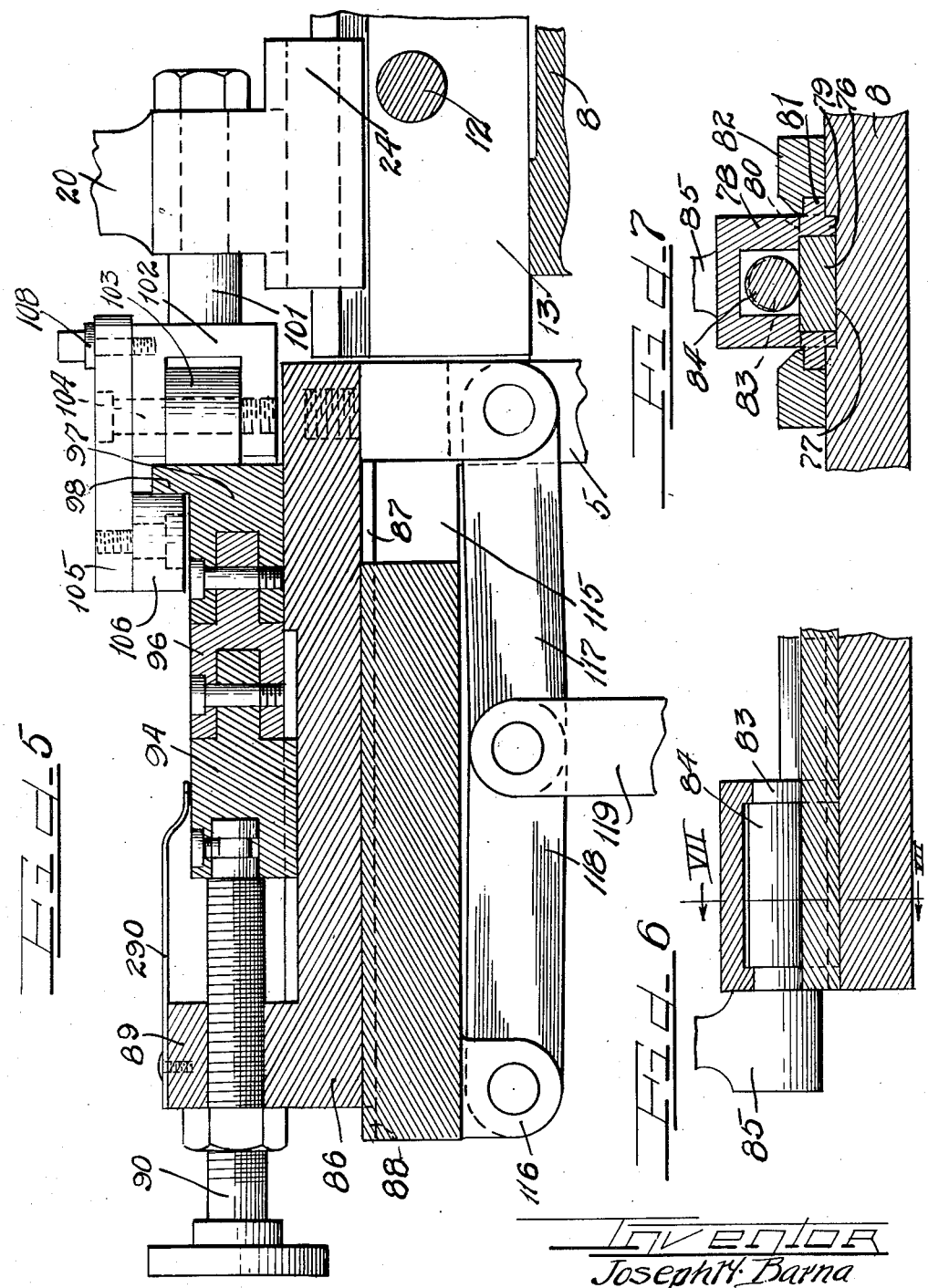

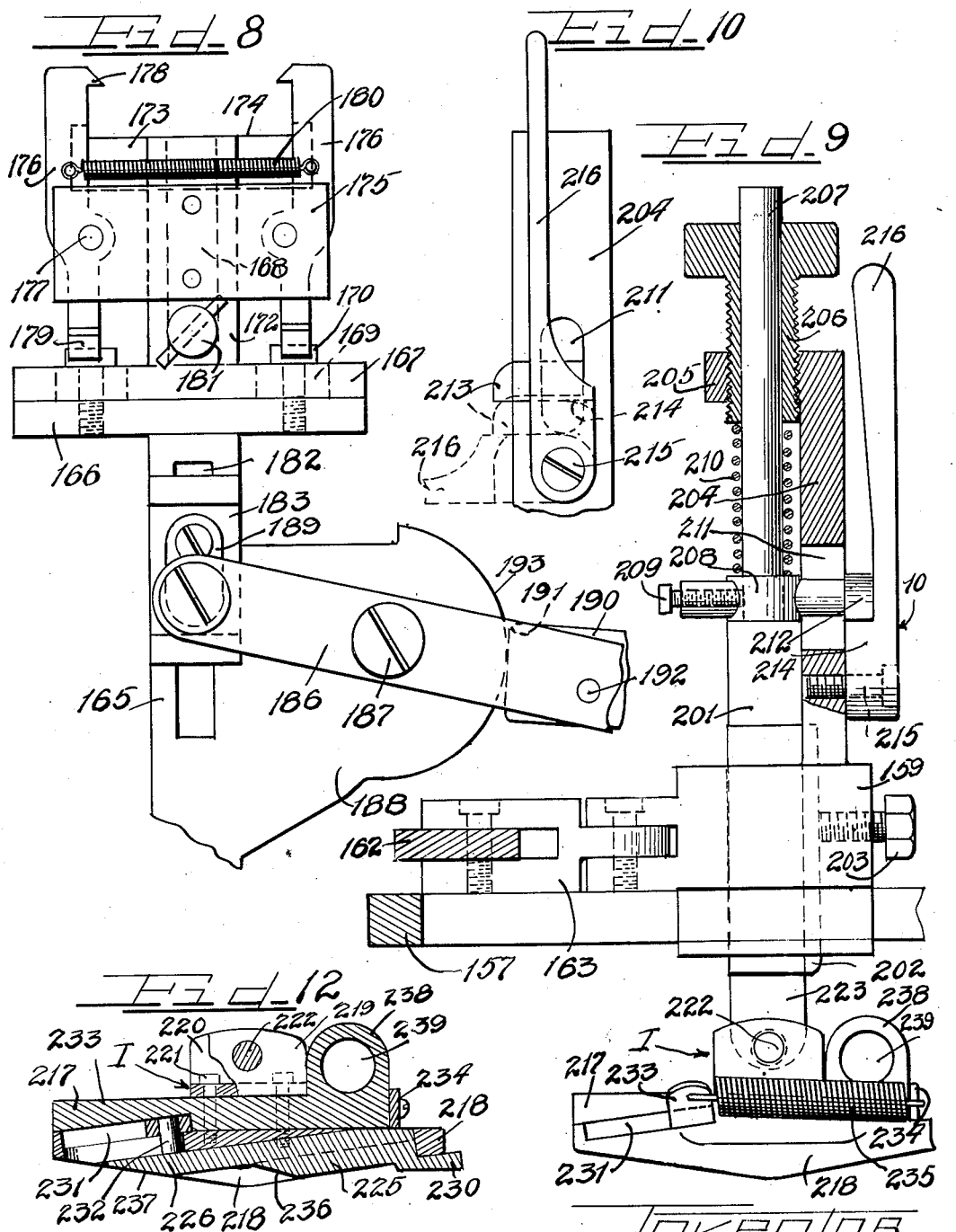

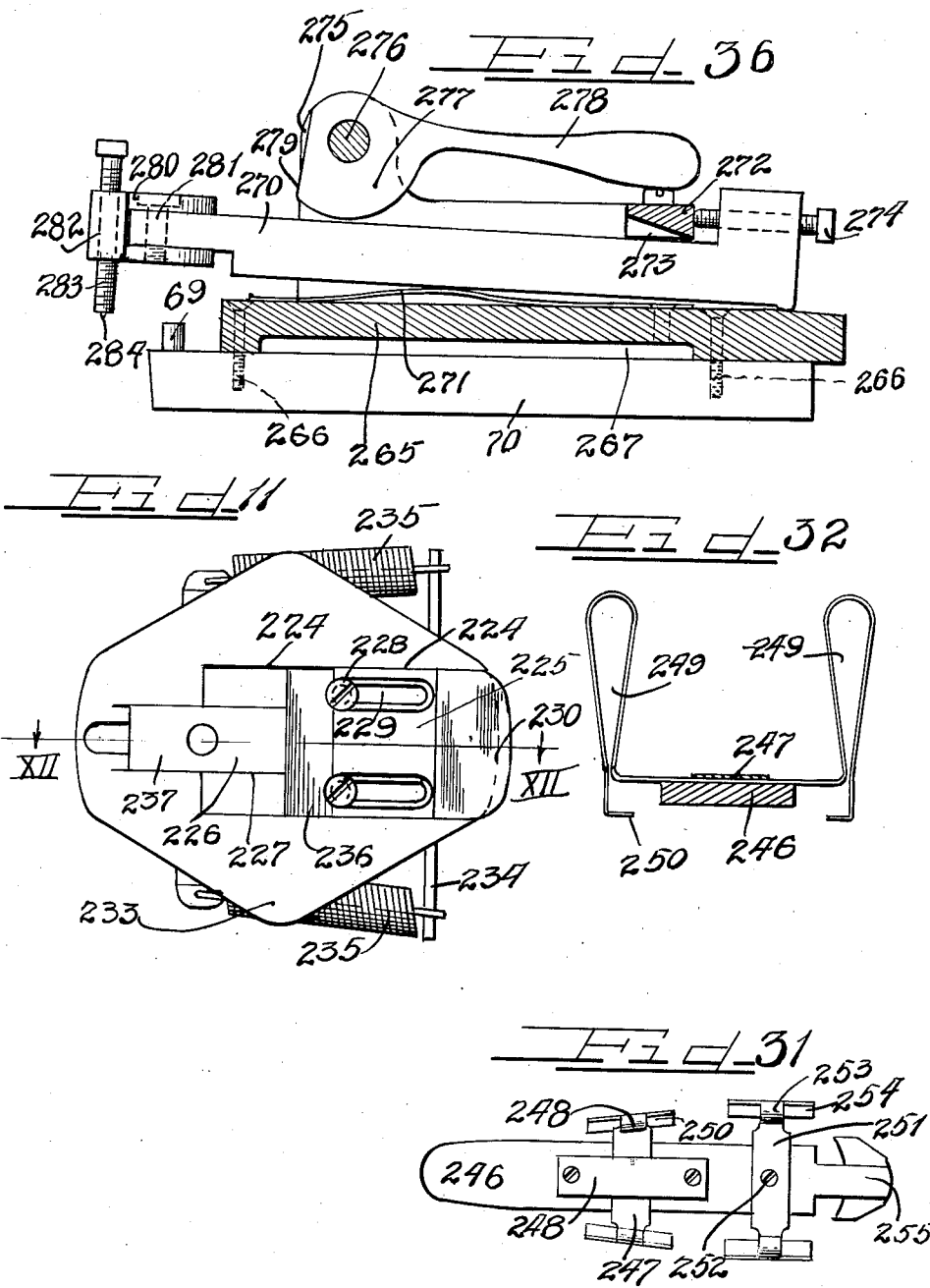

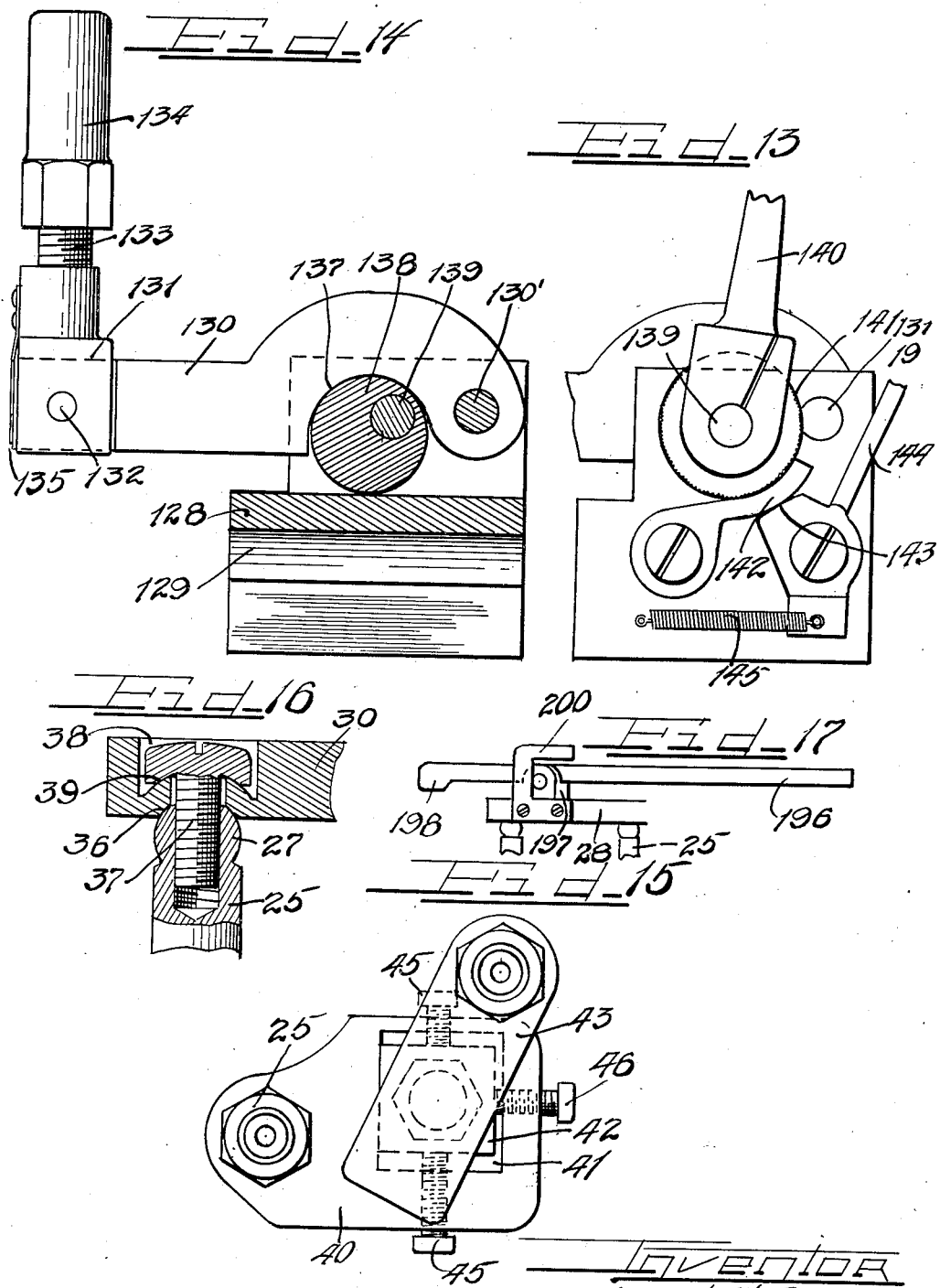

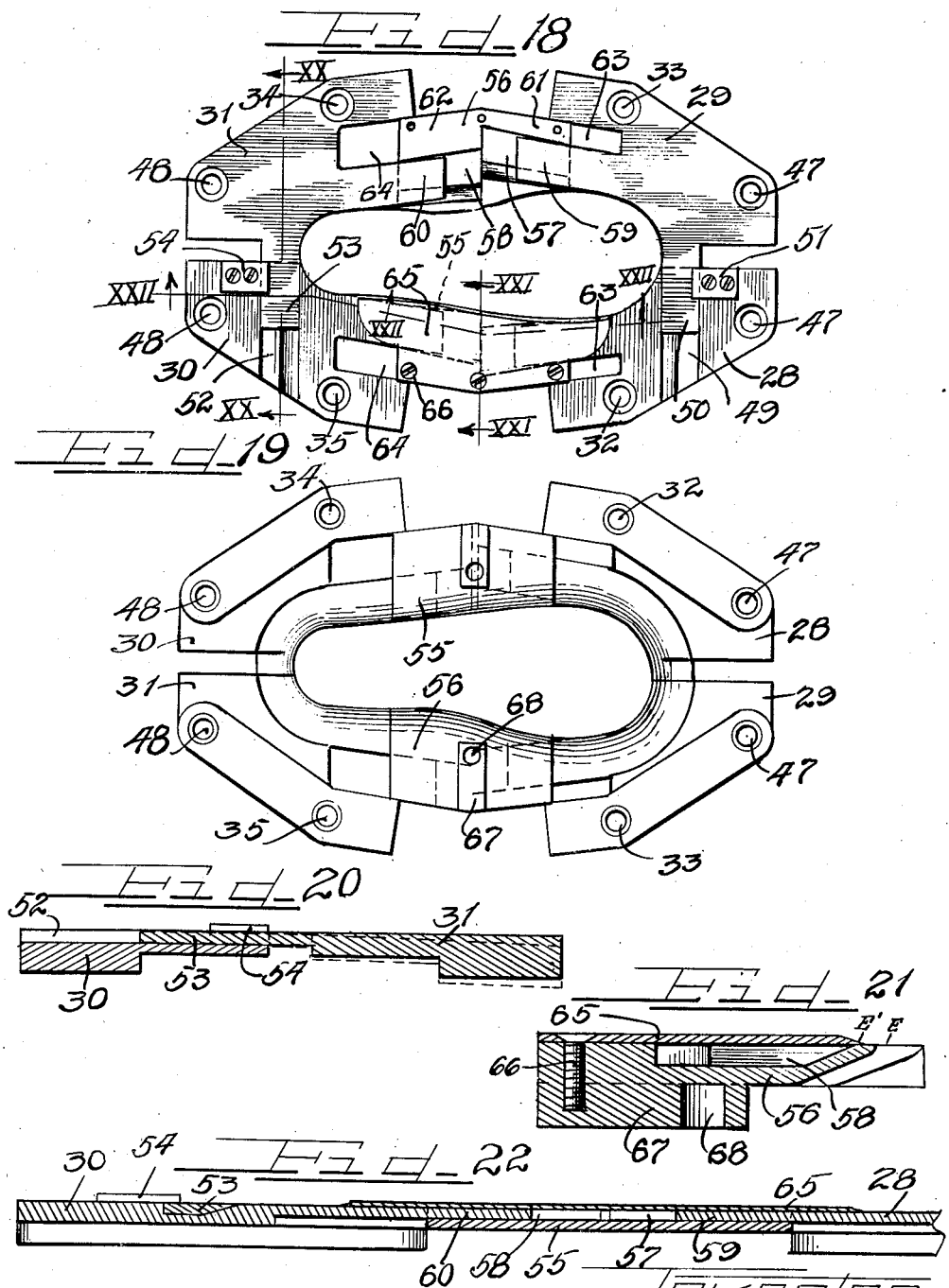

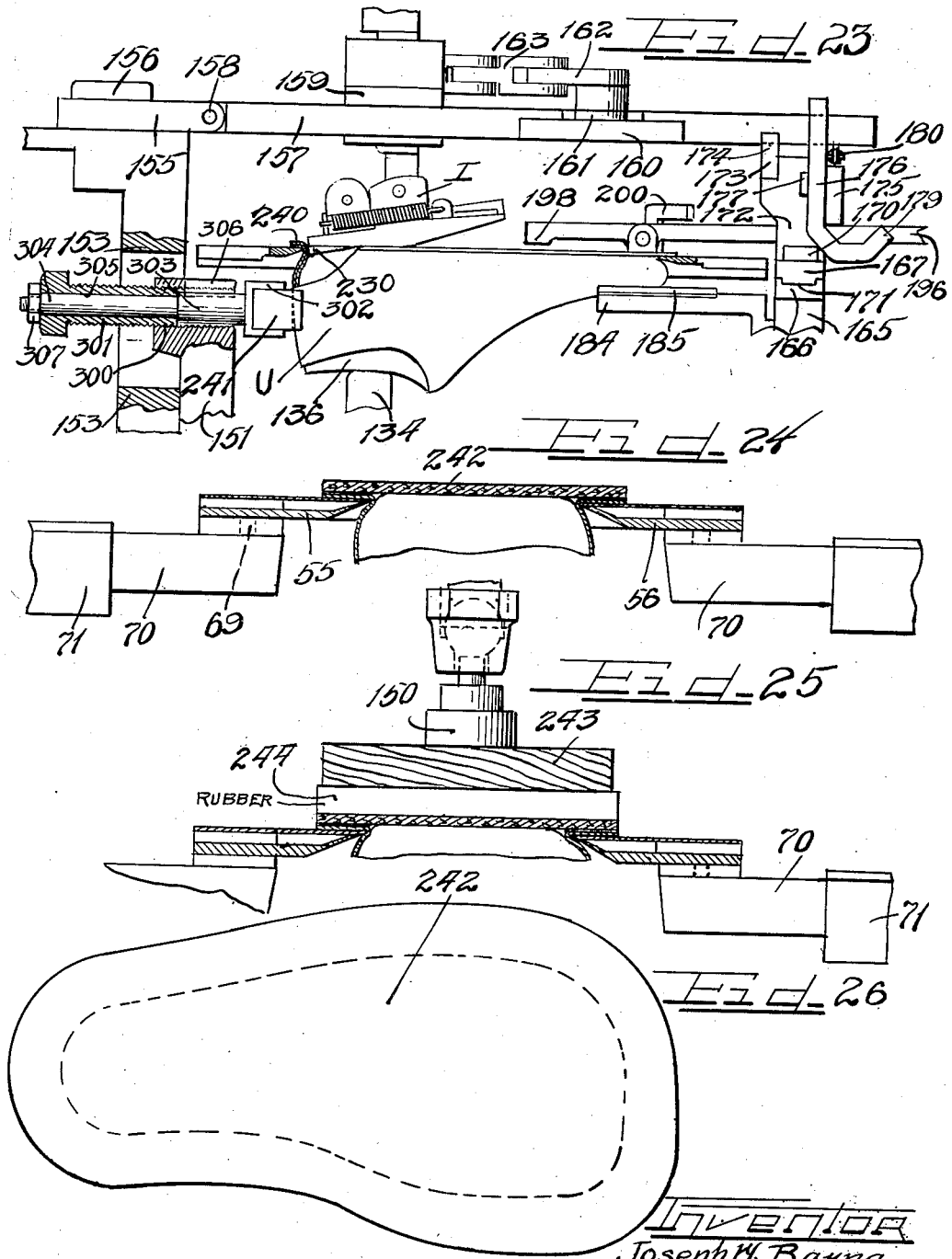

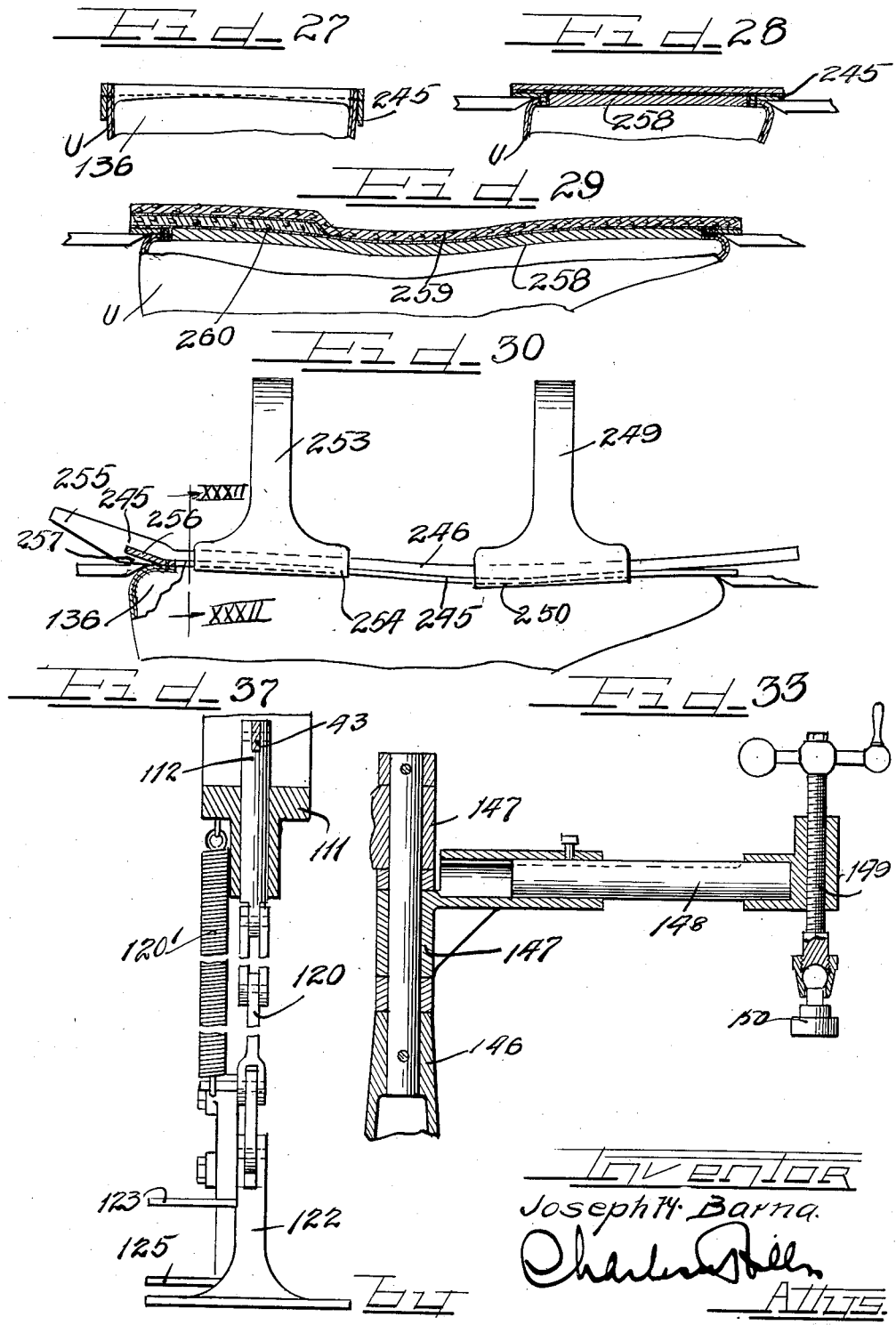

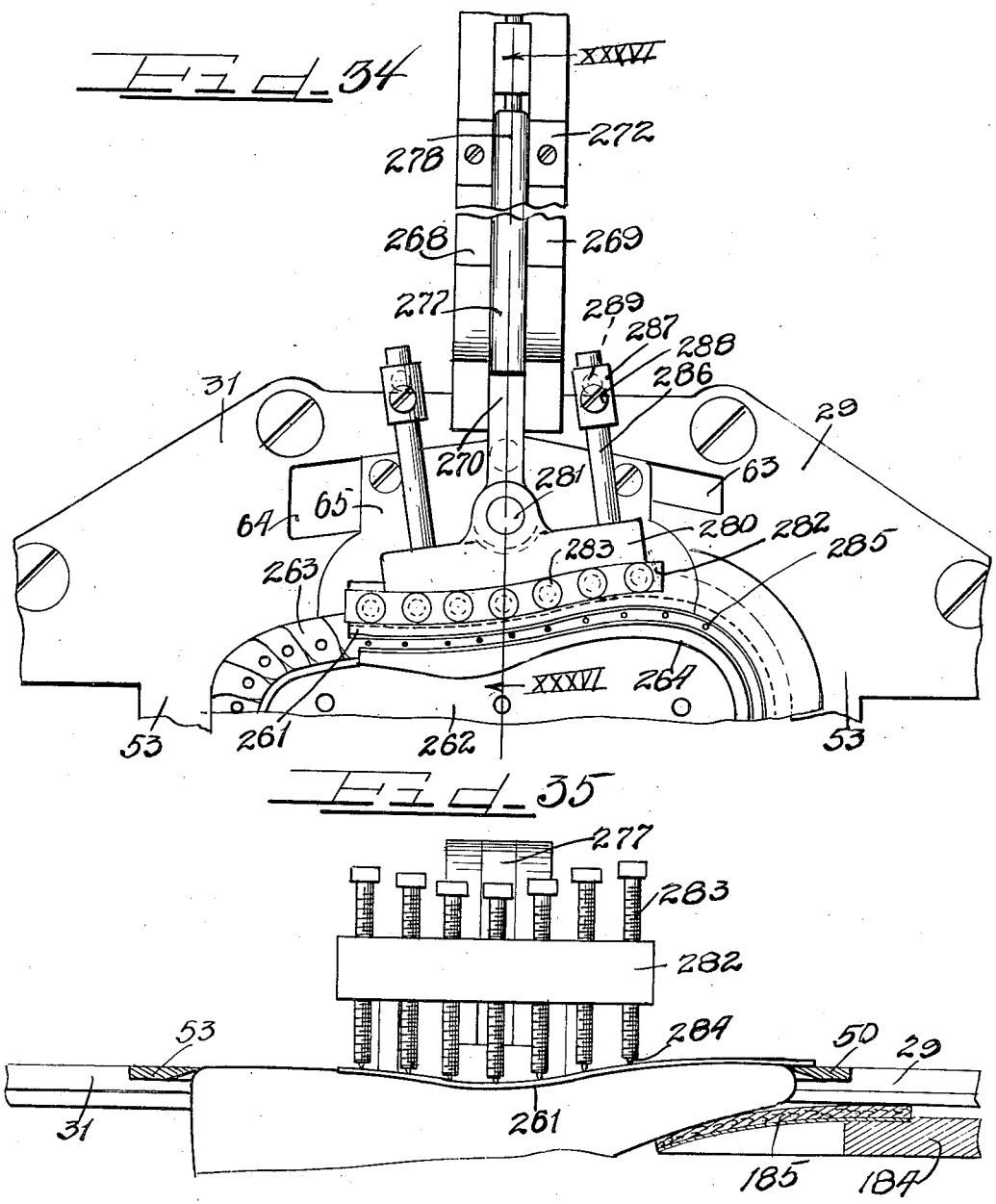

2,144,582

UNITED STATES PATENT OFFICE 2,144,582

LASTING AND SOLE LAYING MACHINE

Joseph W. Barna, Chicago, Ill., assignor of forty-nine percent to C. A. Laystrom, Chicago, Ill.

Application January 7, 1938, Serial No. 183,778

30 Claims. (Cl. 12—7)

This invention relates to means for the lasting of shoe uppers and the arranging and conditioning of the welt portions for receiving soles. The machine herein described is an improvement over the machine disclosed in my copending application Serial No. 39,393, filed September 6, 1935.

An important object of the invention is to provide improved structure and arrangement of the wiper assembly for more accurately and efficiently stretching the upper around the last in a single operation.

Another object is to provide improved adjustable supports for the wiper elements and improved means for relative adjustment of the wiper elements and the securing thereof in adjusted position without strain and so as to permit free relative operative functioning of the wiper elements.

A further object of the invention is to provide an ironing attachment for the machine adjustable and operable for the reciprocation of an ironing head for accurately and quickly flattening and smoothing out the welt portion of the upper for accurate reception of the sole structure.

A further object is to provide a holding attachment for the machine for assisting the wiper assembly in accurately stretching the welt construction of the upper around the last and to hold the welt down while the edge of the upper is tacked to the last preparatory to the sewing of the insole and the welt together.

The invention also embodies numerous other features of construction, arrangement and operation, all of the various features being embodied in the structures disclosed on the accompanying drawings, in which drawings:

Figure 1 is a front elevation of the machine;

Figure 2 is a plan view;

Figure 3 is a section on the plane III—III of Figure 2;

Figure 4 is a section on the plane IV—IV of Figure 1;

Figure 5 is a section on the plane V—V of Figure 4;

Figure 6 is an enlarged section on the plane VI—VI of Figure 2;

Figure 7 is a section on the plane VII—VII of Figure 6;

Figure 8 is a front elevation of the ironer supports;

Figure 9 is a section on the plane IX—IX of Figure 2;

Figure 10 is a side elevation of the ironer adjusting mechanism;

Figure 11 is an under side view of the ironer head;

Figure 12 is a section on the line XII—XII of Figure 11;

Figure 13 is a view on the line XIII—XIII of Figure 4;

Figure 14 is a section on the line XIV—XIV of Figure 4;

Figure 15 is an enlarged top view of the right front wiper supporting pedestal structure;

Figure 16 is an enlarged section on the plane XVI—XVI of Figure 2;

Figure 17 is a section on the plane XVII—XVII of Figure 2;

Figure 18 is a plan view of the wiper assembly;

Figure 19 is a bottom view of the wiper assembly;

Figure 20 is an enlarged section on the plane XX—XX of Figure 18;

Figure 21 is an enlarged section on the plane XXI—XXI of Figure 18;

Figure 22 is an enlarged section on the plane XXII—XXII of Figure 18;

Figure 23 is a side elevation of the wiper assembly and ironer supports showing the ironing operation;

Figure 24 is a transverse section of the side wipers with their supports, showing the application of a sole after the ironing operation;

Figure 25 is a view similar to Figure 24 showing the application of the stretcher to the sole;

Figure 26 is a bottom view of a completed shoe;

Figure 27 is a cross-section of a pre-welted upper;

Figure 28 is a cross-section of the pre-welted upper with inner and outer soles secured thereto;

Figure 29 is a longitudinal section through a fully soled upper;

Figure 30 is a side elevation of a pre-welt expander tool and its application to a welted upper;

Figure 31 is a plan view of the expander;

Figure 32 is an enlarged cross-section of the expander on the plane XXXII—XXXII of Figure 30;

Figure 33 is a longitudinal section of a presser arm and its supporting pedestal;

Figure 34 is a plan view of an attachment for holding the welt down along the sides of the upper;

Figure 35 is an inner end view of the attachment;

Figure 36 is a section on the plane XXXVI—XXXVI of Figure 34; and

Figure 37 is a section on the plane XXXVII—XXXVII of Figure 1.

The supporting frame structure for the machine comprises a pair of opposite spaced parallel angle bars 5 whose upper legs 6 extend horizontally outwardly and whose lower legs 7 extend inwardly and are supported by a base plate 8 rigidly secured thereto as by screws 9. The base plate has a front upstanding block or flange 10 and a rear pair of spaced lugs 11 (Figure 4) which support the guide rods 12 on which the wiper mechanism is carried.

Mounted to slide on the shafts 12 are the front and rear supporting blocks 13 and 14 which may also bear on the base plate 8 (Figures 4 and 5). A shaft 15 is journaled in the front wall 10 of the base and held against axial movement by the collars 16, the shaft at its outer end having the hand wheel 17. The blocks 13 and 14 have threaded passageways therethrough for receiving the right-hand threading 18 and left-hand threading 19 respectively along the inner portion of the shaft 15, so that when the hand wheel 17 is turned, the blocks will be shifted toward or away from each other (Figures 2, 3 and 4).

The block 13 carries the pedestals 20 and 21 for supporting the left and right toe wipers, while the block 14 carries the pedestals 22 and 23 for the left and right heel wipers, these pedestal structures being mounted by their bases 24 on the respective supporting blocks to be shiftable longitudinally thereon, as best shown in Figure 5. As best shown in Figures 3 and 16, each of the pedestals 20 to 23 has a supporting pin 25 threaded axially therein so that it may be raised and lowered, a lock nut 26 being provided for each pin. At its upper end each pin has a spherical head 27. The pins 25 in the pedestals 20 and 21 support the left and right toe wiper plates 28 and 29 at the sides thereof, while the pins 25 in the pedestals 22 and 23 support the left and right heel wiper plates 30 and 31 at the sides thereof (Figures 18 and 19).

The left and right toe wiper plates 28 and 29 have the openings 32 and 33 at their sides, and the heel wiper plates 30 and 31 have the openings 34 and 35 at their sides. The bottoms of the plates surrounding these openings are concave, as indicated at 36 (Figure 16) to fit the cylindrical bearing head 27 of the respective pins 25. Extending through these wiper openings are screws 37 whose heads are within recesses 38 in the tops of the wiper plates, the bottoms of the recesses being convex to receive the concave bottoms of the screw heads, as indicated at 39 (Figure 16). The radii of curvature of the various convex and concave engaging surfaces are centered at the center of the spherical head 27. The wiper plates may thus be readily adjustable and locked in adjustment by the screws 37.

On each of the wiper supporting pedestals 20 to 23 is an arm 40 from which the wiper plates are supported at their outer ends. As best shown in Figures 3 and 15, each arm at its outer end has a rectangular opening 41 therethrough for receiving a block 42 on the upper side of which is a plate 43 adapted to be secured rigidly to the block by a screw 44. Adjusting screws 45 extend through the arm 40 for abutting the block to adjust it transversely in the hole 41, and the end set screw 46 tends to force the block against the back wall of the hole 41 to hold it rigidly after setting of the block by the screws 45. By loosening the screw 44, the plate 43 may also be rotated for adjustment and then secured by retightening of the screw.

At its outer end, each plate 43 has a wiper supporting pin 25 threaded therein like the wiper supporting pins in the pedestals 20 to 23, the pin also terminating in the spherical head 27 and locked in adjusted position by the lock nut 26. The arms 40 on the toe wiper supporting pedestals 20 and 21 extend diagonally with their supporting pins below the end holes 47 in the toe wiper plates, while the arms 40 on the pedestals 22 and 23 extend diagonally for registration of their supporting pins 25 with the end openings 48 in the heel wipers (Figures 18 and 19). These end openings in the wipers, like the side openings, are concave in their inner and outer ends for the reception of the spherical heads of the supporting pins and the fastening screws 37. The adjustability of the pin supporting plates 43 and their supporting arms 40 permits of accurate alignment of the pins with the end openings of the wiper plates and accurate adjustment of the wiper plates relative to each other.

Referring to Figure 2 and Figures 18 to 22, the left toe wiper plate has on its upper side a guide channel 49 for receiving the laterally extending guide tongue 50 on the right toe wiper plate 29, the tongue being retained in the channel by an overhanging plate 51. The left heel wiper plate 30 has a guide channel 52 for receiving the tongue 53 on the right heel wiper plate 31, the tongue being retained in the groove by an overhanging plate 54. The tongue and groove connections serve to guide the left and right wipers in their lateral movement towards and away from each other with their supporting pedestals, the left toe and heel wiper plates moving with the pedestals 20 and 22 respectively and the right toe and heel wiper plates moving with the pedestals 21 and 23 respectively as these pedestals are shifted on their supporting blocks 14 in a manner to be described later.

The side wiper plates 55 and 56 extend between the heel and toe wiper plates. The side wiper plates engage against the under sides of the inner ends of the toe and heel wiper plates. Each of the side wiper plates has on its upper side a channel 57 extending rearwardly from its front end and a channel 58 extending forwardly from its rear end, the channels receiving respectively the tongues 59 and 60 on the toe and heel wiper plates. Outwardly of the channels 57 and 58 the side plates have longitudinally extending projections 61 and 62 for engaging in the slots 63 and 64 in the toe and heel wipers respectively. The slots and tongues are inclined slightly laterally outwardly so that when the end wipers are adjusted farther away from each other, the side wipers will be cammed farther away from each other so that the last openings defined by the wiper plates will assume the sizes corresponding to the sizes of the lasts to be accommodated.

It will be noted that the channels 57 and 58 gradually increase in width inwardly, this being for the purpose of preventing binding when the wiper assembly is contracted or expanded during setting for the desired last size. The wiper plates and the various tongues are beveled along their inner sides so that the wipers will present substantially sharp edges E (Figure 21) for engaging with the shoe uppers below the marginal portions thereof so as to draw the leather around the rounded corners of the last block. To hold the tongues and channels of the end wipers and side wipers in proper engagement, thin cover plates 65 are secured to the side wipers as by screws 66, the inner edges E' of the thin cover plates being beveled down, as best shown in Figure 21, and terminating a distance outwardly of the edges E of the toe and heel wiper plates, the cover plates therefore having no edge engagement with the uppers during the wiping operation.

Each of the side wipers has a lug 67 on its under side provided with a hole 68. Referring to Figures 2 to 4, inclusive, and 24, the holes 68 in the side wipers loosely receive pins 69 extending upwardly from the inner ends of supporting rods 70 which are slidable crosswise of the machine in heads 71 at the upper ends of vertical bars 72 adapted to be secured at their lower ends, as by screws 73, to the legs 74 of a U-frame 75 secured to the inner end of a slider plate 76 which extends rearwardly on the base plate 8 and is guided in the guideway 77 in the base plate. Referring to Figures 3, 6 and 7, a housing 78 spans the rear end of the slider plate 76 and has lugs 79 extending through recesses 80 in the sides of the slider plate so that the slider plate may move with the housing, the housing having side tongues 81 engaged by keeper bars 82 secured to the base plate 8. Extending longitudinally and journaled in the end of the housing 78 is a shaft 83 having the eccentric portion 84 and being turnable by a lever 85.

The lever 85 serves as a handle for shifting the slider plate 76 and the side wipers thereon for adjustment of the side wipers relative to the end wipers, and after such setting the lever is turned to engage the cam 84 with the slider plate to press the slider plate against the base plate and so hold it in set position. The supporting bars 70 are freely slidable in the heads 71 and with the free engagement of the pins 69 in the side wiper holes 68, the side wipers may readily follow the movements of the end wipers during setting for last size. The bars will support the side wipers against pressure during the lasting operation. As the upright bars 72 which support the rods 70 are adjustable on the U-frame 75, the side wiper plates may be readily adjusted vertically relative to the end wipers.

As has already been explained, turning of the hand wheel 17 will effect movement of the wiper pedestal supporting blocks 13 and 14 toward or away from each other on the supporting rods 12, and the pedestal structures 20 to 23 are shiftable laterally on the blocks 13 and 14. The mechanism for shifting the pedestals on the blocks is best shown in Figures 4 and 5. The upper legs 6 of the supporting bars 5 are each provided with a table 86 slidable thereon transversely, and each table is guided by runners 87 engaging in guideways 88 in the supporting leg or plate 6. At its outer end, each table 86 has a vertical wall 89 through which is threaded a number of adjusting screws 90, 91, 92 and 93. As shown in Figure 5, the screw 90 is threaded to a block 94 slidable in the channel 95 in the table 86, the inner end of the block 94 being pivoted to a link 96 which at its inner end is pivoted to the outer end of a cam bar 97 having the upstanding cam rail 98 along its inner edge, the link and cam bar engaging the top surface of the table for lateral movement thereon. The screw 91 is swiveled to a block 99 guided in the channel 100 in the table, and this block at its inner end is pivoted to the inner end of the cam bar 97.

Referring to Figures 4 and 5, the wiper supporting pedestal 20 has a bar 101 extending outwardly therefrom and terminating in a clevis 102 for receiving a cam roller 103 journaled on a pin 104 extending through the clevis, this roller engaging the inner face of the cam bar 97. An arm 105 in the form of a plate is mounted on top of the clevis and is held in place by the head of the pin 104 which extends therethrough, the arm at its outer end supporting a cam roller 106 which engages the outer face of the cam rail 98 on the cam bar 97. At its inner end, the arm 105 has an arcuate slot 107 (Figure 4) for receiving a pin 108 which threads into the clevis 102, the arm 105 having thus limited rotational movement on the pin 104, so that the cam rollers may accurately follow the cam surfaces of the cam bar 97 without binding.

The cam bar 97a is connected with the wiper supporting pedestal 22 and with the adjusting screws 92 and 93 by the same structure and in the same manner as that connecting the cam bar 97 with the pedestal 20 and the adjusting screws 90 and 91. The cam bars 97b and 97c at the opposite side of the machine are associated with the wipers 21 and 23 respectively in the same manner as the cam bars 97 and 97a are associated with the pedestal 22.

Upon outward shifting of the tables 86, their connections through the cam bars with the wiper pedestals will shift the respective pedestals for bringing the left toe and heel wiper plates farther away from the right toe and heel wiper plates, the side wiper plates following such movement on account of their interlocking engagement with the toe and heel wiper plates. The cam bars are inclined so that when the hand wheel 17 is turned for relative shift of the supporting blocks 13 and 14, the cam surface of the cam bars, cooperating with the cam rollers, will automatically effect lateral movement of the pedestals on the blocks for lateral adjustment of the wiper plates.

Toggle means are provided for shifting the tables 86 for expansion of the wiper plate assembly for reception of the last and the upper thereon to be soled. The toggle mechanism is best shown in Figures 1, 5 and 32. The table 110 on which the machine is mounted has a yoke frame 111 secured thereto through which extends a rod 112 pivoted at its upper end to a cross-bar 113 extending through the frame 111. Each table 86 has at its inner end a lug 114 extending down through a slot 115 in the supporting plate 6, each plate at its outer end having a lug 116 depending therefrom. Toggle links 117 and 118 extend from the lugs 114 and 116 respectively and at their ends these links are pivoted to a transmission link 119 pivoted to the adjacent end of the cross-bar 113.

The rod 112 extending from the cross-bar 113 is connected by linkage 120 with a treadle lever 121 pivoted intermediate its ends on a pedestal 122, the treadle lever at one end having a pedal 123 suspended therefrom by a pivot connection 124, and at the other end of the treadle lever is the pedal 125 suspended therefrom by a pivot connection 126, the pivotal supports of the pedals always holding the foot plates 127 of the pedals in horizontal position for convenient engagement by the operator's foot. Figures 1 and 5 show the pedal 125 down and the bar 113 raised for closure movement of the toggle links 117 and 118, so that the tables 86 are in their inner positions for closure of the wiper assembly. Upon depression of the pedal 123, the toggles will be opened for outward shift of the tables for expansion of the wiper assembly for reception of the last and upper thereon. A spring 120' may be applied for yieldably holding the toggles in position for setting of the tables 86 in their inner positions.

The jack structure for supporting the last is best shown in Figures 3, 13 and 14. A bearing block 128 rides on the bed plate 8 and is secured to the rear pedestal supporting block 14 to move therewith, the block having the clearance passage 129 for the shaft 15. The jack supporting lever 130 is pivoted at its rear end on the shaft 130' supported by the block 128, the lever at its front end being straddled by a frame 131 and pivoted thereto by a pin 132, the frame having the threaded stud 133 for receiving the jack head 134. A spring 135 anchored to the frame 131 engages against the end of the lever and tends to hold the jack head in upright position but permits yield thereof so that it may readily enter the receiving hole in the jack last 136 (Figure 23).

Adjacent its pivoted end, the lever 130 has the arcuate recess 137 for receiving the cam 138 on the cam shaft 139 supported by the block 128, the cam shaft at its outer end having the lever 140 secured thereto. Between the lever and the block 128, the cam shaft carries a brake disk 141 preferably provided with ratchet teeth for engagement by a brake pawl 142 which may be held interlocked with the brake disk by a cam plate 143 having a release lever 144, the spring 145 tending to swing the cam plate to hold the pawl and brake disk interlocked. By rotation of the cam 138, the jack lever is adjusted for setting of the jack head and the last thereon in proper position relative to the wiper assembly and after setting of the jack the locking pawl 142 will hold it in set position at the proper height.

Figure 33 shows the upper part of a press used in connection with the lasting and soleing operation particularly for pressing down the sole against the welt of the upper. The press comprises a pedestal 146 on which two hubs 147 are rotatable for adjustably supporting arms 148 whose outer ends have the pressure screws 149 carrying at their lower ends the presser heads 150. Two of the lasting machines are usually mounted side by side with the press pedestal mounted between them, so that while one of the press arms is holding down the sole on one of the machines, the operator may use the other press arm for the work in the other machine. I also provide an ironing attachment on the machine which is used for ironing and flattening out the welt portions after the upper has been clamped to the last block by the wiper assembly.

Referring to Figures 1, 3 and 4, a supporting pedestal 151 seats on top of and is secured to the rear supporting block 14, as by screws 152 (Figure 4). A supporting bracket 153 is supported by and vertically adjustable on the pedestal 151 by screws 154. A plate 155 is rotatably mounted on top of the bracket 153 by a screw 156, a bar 157 having a hinge connection 158 with the plate 155. Slidably mounted on the bar 157 is the carriage 159 for the ironer head to be presently described. A bracket 160 secured to the side of the bar 157 supports an arm 161 which is pivoted at its outer end to the inner end of a lever 162 which is connected by a link 163 with the carriage 159, so that when the lever is swung back and forth the carriage will be shifted back and forth on its supporting bar 157. When the iron is to be used, the bar 157 is swung to extend longitudinally over the wiper structure, and when the iron is out of use, the bar 157 is swung back against a stop post 164.

Means are provided for holding the bar 157 at its front end for the ironing operation. When in this ironing operation position, the hinge connection 158 will be clear of the top of the bracket 153, and when the ironer is not in use and the bar 157 is swung back against the stop 164, the bar 157 will lie against the top of the bracket and so be held in its horizonal position.

The mechanism for supporting the ironer bar in its operating position is best shown in Figures 1, 2, 3, 8 and 23. An L-shaped support 165 is secured to the front wiper pedestal supporting block 13 and extends upwardly in front of the wiper assembly (Figure 3). A cross-plate 166 is secured to the upper end of the post, this crossplate receiving the base 167 of a post 168, the base having elongated slots 169 for receiving the screws 170 threading into the cross-plate 166 so that the base 167 with the post thereon may be adjusted laterally, the cross-plate and the base 167 preferably having tongue and groove connection, as indicated at 171. Surrounding the post 168 is a sleeve 172 at the rear part of which and at the top thereof is a cross-bar 173 having the rectangular recess 174. Against the front of the sleeve is secured a plate 175 at whose ends are pivoted the latch levers 176 by pins 177, the levers bearing against the rear side of the plate 175. At their upper ends and on their inner sides the levers have beveled latch hooks 178 and at their lower ends the levers have forward extensions 179 serving as abutments for the hooks so that the levers may be swung to spread their upper ends apart, a spring 180 connecting the levers above their pivot points and tending to hold them in normal position.

When the ironer is to be used, its supporting bar 157 is swung forwardly and its front end swung down past the hook ends of the latch levers 176 and into the recess 174 of the bar 173, the spring 180 then returning the latch levers so that the hook ends will hold the bar in position, the hinge connection 158 permitting vertical movement of the bar necessary for seating it on the supporting bar 173. When the bar is thus positioned, the carriage 159 with the ironing head thereon may be shifted back and forth along the bar by means of the lever 162 for application of the ironing head to the work. The application of the ironing head I is shown in Figure 23. In order that the ironing head may accurately engage with the welt portions of an upper, the supporting base 167 for the plate 173 which supports the front end of the ironer head supporting bar 157 is made laterally adjustable by means of the screw and slot connections 170 and 169 of the base with the supporting plate 166 as has already been explained. In order that such lateral adjustment may not bind the bar in the supporting plate 173, the sleeve 172 which supports this plate is rotatably adjustable on the post 168, a set screw 181 being provided to secure the sleeve after adjustment.

Referring particularly to Figures 3 and 23, the support 165 has a vertical slot 182 for a block 183 from whose upper end a shelf 184 extends inwardly to receive and support the toe end of the upper on the last block during the ironing, pressing or other pressure engagement with the last so as to prevent displacement thereof from the wiper assembly, the shelf being preferably provided with a pad 185 so that the upper material will not be damaged (see also Figure 35).

For adjusting the supporting block 183 for the shelf 184, a lever 186 is provided which is pivoted as by a screw 187 on a bracket 188 extending laterally from the support 165 (Figures 1, 2 and 3). At its inner end, the lever is connected by a link 189 with the block 183 so that when the lever is rotated the block 183 is moved vertically for adjustment of the shelf 184. In order to lock the block 183 in adjusted position, a clamping block 190 is pivoted by a pin 192 to the lever for friction cooperation at its inner end with the surface 193 of the outer end of the bracket 188, the curvature of this surface being eccentric relative to the path of movement of the pin 192. The member 190 is provided with a handle 194 between which and the lever is interposed a spring 195 (Figure 1) which tends to swing the handle in counter-clockwise direction with the end of the block 190 pressing against the surface 193, the upper corner or point 191 of the block being at a greater distance from the pivot pin 192 than the lower point.

With this arrangement, any pressure applied downwardly against the supporting shelf 184 will cause pressure and clamping engagement of the cam member with the cam surface 193 so that the shelf will be rigidly locked in adjusted position. When it is desired to release and withdraw the shelf, the handle 194 is depressed to rotate the cam member 190 in clockwise direction to release the pressure of the cam against the cam surface so that the shelf may be withdrawn, and readily raised back to its supporting position to be then locked when the handle is released.

Cooperable with the last supporting shelf 184 and the last jack 134 for properly aligning the upper last relative to the wiper assembly, are presser levers 196. These levers are pivoted in brackets 197 secured to and having swivel connection with the toe wiper plates 28 and 29 (Figures 2 and 17). The levers at their inner ends have knobs or lugs 198 adapted for engagement with the last when the levers are swung laterally so that when the front ends of the levers are raised, pressure will be exerted against the last for properly seating it on the shelf 184. When the levers are swung to bring their inner ends over the last, the outer ends of the levers enter the C-shaped stops 200, and then when the outer ends are raised to bring the inner ends against the last, the stops will hold the levers against further vertical swing when the last has been pressed down to properly seat on the adjusted shelf 184. After such adjustment of the last, the levers, when released, will be swung to their normal position by the springs 199.

Describing now the ironing head and its adjustment, this is best shown on Figures 1, 9 to 12 and 23. The head is supported on the lower end of a vertical bar 201 slidable through a U-shaped bushing 202 secured in the carriage 159 which is mounted on the supporting bar 157, the bushing being locked in position by a set screw 203. The carriage block 159 has the wall 204 extending upwardly therefrom alongside of the ironer supporter bar 202 and at its upper end has the lateral part 205 threaded to receive an abutment sleeve 206 through which extends the stem 207 on the upper end of the bar 201. A collar 208 is adjustably secured to the pin 207 as by a set screw 209, Figure 9, this collar forming the abutment for one end of the spring 210, whose other abutment is the sleeve 206, the spring tending to shift the bar 201 downwardly.

Extending laterally from the collar 208 through a slot 211 in the wall 204 is an arm 212 terminating in an abutment head 213 for a cam 214 rotatable on the pin 215 extending from the wall 204, the cam being provided with the operating handle or lever 216. The setting of the cam determines the distance that the ironing head I may move downwardly, but the head is yieldably movable upwardly against the resistance of the spring 210, this resistance and consequently the pressure of the ironing head against the work being adjustable by means of the sleeve 206. The ironing head I comprises an upper or body plate 217 and a lower or ironing plate 218. Mounted on the body plate are two spaced apart L-brackets 220, the brackets being secured by screws 221 which extend through the body plate and have threaded engagement in the ironing plate, so as to secure the brackets and at the same time detachably secure together the body and ironing plates. The brackets support a pin 222 for receiving the tongues 223 extending from the lower end of the supporting rod 201 and engaged between the brackets 219 and 220, the ironing head being thus adapted for swing in a vertical plane. The ironing surfaces on the under side of the ironing plate incline upwardly gradually from the transverse center line of the plate, so that the ironing head may partake of a rocking movement during the ironing operation.

In its bottom, the ironing plate 218 has a longitudinally extending recess 224 in which a plate 225 is slidable and which has a longitudinally extending guide and actuating tongue 226 extending upwardly therefrom for engagement in the guideway 227 communicating with the recess 224. The plate and its tongue are held in place by screws 228 engaging through the longitudinal slots 229 in the plate and threaded into the ironing plate. At its front end, the plate 225 has a tongue 230 which is normally projected a distance beyond the front end of the ironing base 218, the tongue being rounded at its outer end to conform to the rounding of the front end of the ironing base, as shown in Figure 11.

The body 217 and base 218 of the ironing head are cut away at their rear ends to leave a transverse passageway 231 into which extends a post 232 secured to the tongue 226, a cross-bar 233 extending through the passageway 231 receiving the post. Secured against and across the front of the body 217 is a cross-bar 234. The ends of the cross bars are connected by tension springs 235 which tends to hold the bar 233 forwardly with the plate 225 abutting the front end of the recess 225 and with the tongue 230 projected as shown in Figures 11 and 12. The purpose of the tongue 230 is to abut against the heel of an upper to hold the heel in proper position and condition preparatory to ironing of the heel welt portion by the front end of the ironing base, as indicated in Figure 23. When the ironing head is shifted rearwardly, the tongue 230 encounters the heel portion of the upper at the base of the welt portion and as the ironing base continues to effect the ironing of the welt portion, the spring 235 will hold the tongue with pressure engagement against the upper. As the ironing head is withdrawn from the heel portion, the tongue 230 will continue to hold the heel in place until the tongue has again reached its outermost position. The ends of the plate 225 and the tongue 226 ar beveled as indicated at 236 and 237 (Figures 11 and 12) so that the beveled surface will merge into the inclined ironing surfaces of the ironing base when the plate 225 and the tongue 230 thereon are shifted inwardly during the ironing operation.

For heating the ironing head, a boss 238 thereon may have a bore 239 for receiving an electrical heating coil (not shown).

Figures 23 to 26 illustrate the application of a sole to an upper U, of which the marginal portion 240 forms the sole receiving welt, this welt portion being usually defined by creasing the upper to define the bending line for forming the welt. The wiper assembly is primarily fully expanded by depressing the foot pedal 123 to open the toggles for outward movement of the tables 86 to spread the wipers laterally, and by turning the hand wheel 17, the wipers are spread longitudinally. The last with the upper thereon is then applied to the jack head 134 and the pedal 125 is depressed for closure of the toggles and movement of the tables 86 to their inner position for primary closure of the wiper plates. By adjustment of the jack mechanism, the heel part is aligned, and by adjustment of the shelf 184, the toe part is aligned relative to the wipers, the presser levers 196 being used, if necessary.

After proper alignment has been effected, the hand wheel 17 is turned for final setting of the wiper assembly, longitudinal movement of the toe and heel wipers toward each other being accompanied by transverse movement of these wipers toward each other under the action of the cam bars 97, 97a, 97b and 97c, the side wipers automatically following on account of their camming interlock with the toe and heel wipers. As the wiper assembly is finally contracted, the wiper edges engage the upper along the base of the welt portion 240 and the upper is intimately drawn to the last around its corners.

Provision should be made for preventing slipping of the heel portion upwardly on the last block when the wiper assembly is contracted. Heretofore the heel part was tacked to the last block to hold it against slipping. I have provided improved means which will eliminate tacking but which will efficiently hold the heel against any creeping or slipping during the wiping operation. Referring to Figures 3 and 23, a block 241 of friction material, such as rubber, is supported to be pressed against the heel of the upper to hold it securely against the last block against slipping. In the arrangement shown, the pedestal 151 has at its upper end the threaded passageway 300 for a screw 301. The block 241 is secured in a U-frame 302 having a shank 303 extending therefrom into the inner end of the passageway 300, the stem 304 extending from the shank through the bore 305 of the screw. A key 306, engaging the shank 303, prevents it from turning. The screw 301 abuts at its inner end against the shoulder between the shank and the stem, and at its outer end abuts a nut 307 on the stem. With this arrangement, when the screw is turned in clockwise direction, the shank is shifted inwardly for setting of the friction block 241 against the upper, while when the screw is turned in the opposite direction, the block will be released from the upper. With this friction block clamping against the heel of the upper, the heel portion will be held against slipping on the last block when the wiper assembly is contracted.

After the lasting operation, the ironer supporting frame 157 is swung to operative position with its front end resting on the supporting plate 173 to which it is locked by the latch hooks 176. The lever 162 is then operated to shift the ironing head back and forth along the welt portion which preferably has been moistened sufficiently, the pressure and heat of the ironing head then flattening and smoothing the welt portion down against the wiper plates. Before the ironing base reaches the heel part of the welt, the tongue 230 on the ironing head abuts the heel of the upper adjacent the heel welt portion and presses it against the heel wiper edges while the ironing head continues to iron the heel welt portion, this engagement of the tongue 230 with the upper preventing the formation of kinks or creases in the heel corner. As has been explained, the ironer support may be adjusted vertically and laterally so that the ironing head may accurately follow the welt portion to be ironed, the spring 210 (Figure 9) supplying the necessary ironing pressure and the tiltable support of the ironing head will enable its inclined ironing surfaces to accurately engage with the welt portion.

After the ironing operation, the ironing structure is swung back to its rest position and a sole 242 is applied to the welt portion and secured preferably by cementing under pressure. As shown in Figure 20, one arm of the press shown in Figure 33 is utilized, a presser block 243 having a yieldable facing 244, preferably of rubber, being applied between the press foot 150 and the sole.

Figures 27 to 31 illustrate how a pre-welted upper is soled. Figure 27 shows the welt strip 245 sewn around the upper, the upper being on the last 136. An expander tool such as shown in Figures 30, 31 and 32 is then used to swing or expand the welt strip into horizontal position particularly along the sides and the heel. The expander comprises a body in the form of a plate 246 having a rear cross bar 247 adjustable lengthwise on the body below a retainer strip 248, the bar terminating at its ends in upwardly extending loops having their lower ends 250 deflected inwardly a short distance below the body, as best shown in Figure 32. A front cross plate 251 is held to the body by a screw 252 and at its ends has loops 253 terminating in inwardly deflected ends 254. As shown in Figures 30 and 31, the ends 250 and 254 are extended longitudinally relative to the body 246 so as to give more extensive surface for engagement with the edge and under side of the welt strip 245. At its heel end the plate 246 has a narrowed extension 255 inclined slightly upwardly, the extension being provided with a slit 256 for receiving the welt strip, the bottom of the extension below the slit having a substantially horizontal under surface and terminating in a point. The expander is applied by drawing its heel end forwardly to receive the heel portion of the welt strip and to raise it as shown in Figure 30, the clamping loops 249 being thus spread and their ends 250 and 254 applied under the welt strip so as to raise the strip along the sides of the upper.

The last with the upper thereon and with the welt held expanded by the expander is then placed in the expanded wiper assembly of the machine and the toggle is operated for closure of the wiper assembly, the ends 250 and 254 of the clamps being thin so that the side wipers may pass thereunder, the heel wipers then engaging under the extension 255 of the plate, as shown in Figure 30. The toe end of the welt has been partially raised by the expander clamps 254 and will readily flatten out when the last is applied to the wiper assembly. The wiper plates will now hold the welt spread so that the expander may be removed, and then after final adjustment of the wiper assembly, the hand wheel 17 is turned for final closure of the wiper assembly and the welt will be lying flat on top of the wipers. If necessary, the ironing tool may now be applied for ironing and flattening the welt.

As shown in Figure 28, an insole 258 may be inserted before the outer sole 259 is applied. This outer sole may be secured to the welt and to the insole as by means of suitable cement.

As shown in Figure 29, a heel filler 260 may be inserted and secured under the heel of the outer sole.

Figures 34, 35 and 36 show an attachment for holding down the welt, particularly when the welt extends only along the sides and toe of the upper, and where a channeled insole is used and the heel of the upper is drawn around and tacked to the insole. The arrangement is shown in Figure 34, 261 indicating the welt extending around the sides and toe, 262 indicating the insole which is temporarily tacked to the last, and 263 indicating the upper heel deflected around and tacked to the insole. The insole has the channel or undercutting 264 through which the insole is to be sewn to the welt.

The attachment is applied to the rods 70 which by their pins 69 engage with the side wipers of the wiper assembly. The attachment comprises a base 265 secured on the rods 70 as by means of screws 266, the bases having recesses 267 so that they may straddle the supporting heads 71 in which the rods 70 are slidable for adjustment of the side wipers.

Each plate has the upstanding side walls 268 and 269 between which extends the supporting bar 270. The bar is slidable longitudinally between the walls and fulcrumed at its rear lower corner on the base 265, the spring 271 tending to swing the bar upwardly. A cross-wall 272 spans the walls 268 and 269 at the rear end and is detachably secured thereto, the wall having the clearance slot 273 in its lower side for the bar 270. The forward shift of the bar is limited by a set screw 274 thereon which abuts the cross-wall 272. At their inner ends the walls 268 and 269 have the upward extensions 275 receiving the pin 276 for a cam 277 having the operating handle 278. The cam has the flat side 279 engaged by the bar 270 when in its upper position, and when the cam is rotated, it will depress the bar, as shown in Figure 36.

At its inner end, each bar 270 receives a head 280 pivoted thereto as by a pin or screw 281 so that the head may swing in a horizontal plane. Secured against the outer side of the head 280 is a bar 282 through which thread a row of pins 283 having points 284 at their lower ends.

Referring to Figures 34 and 35, the last assembly is placed in the spread apart wiper structure and the toggle is then operated for primarily contracting the wiper assembly. The bar 270 and the holding attachments are then shifted longitudinally and the heads 280 are swung to bring the rows of pins 283 into alignment with the welt at opposite sides of the last and the pins are then adjusted vertically for application of their points to the welt. The cams 277 are then swung down to depress the bars 270 and to project the pin points into the welt and hold the welt securely against the wiper assembly. The hand wheel 17 is then turned for final contraction of the wiper assembly, so that the upper portion with the welt thereon is stretched around the last in proper position relative to the insole 262. After the lasting operation, the holders are released and withdrawn so that the tacks or nails 285 may then be driven through the deflected over upper portion and into the insole to hold the upper and welt for the stitching operation when the last is removed from the machine, the stitching being through the insole undercut 264 and the welt in a manner well understood in the art.

To maintain the setting of the pin supporting heads 280 ready for the next last assembly, pins 286 extend outwardly from the head 280 and have collars 287 detachably secured thereon by set screws 288, the collars having abutment posts 289 depending therefrom for engagement with the outer edges of the wiper assembly. After the heads and pins have been set, the collars 287 are set on the pins 286 with the posts abutting the wiper edges, so that the adjustment and setting is maintained for the size of shoe to be worked on in the machine.

Referring to Figure 4, pointers 290 may be mounted on the tables 86 for cooperating with scale marks on the various cam blocks 97 which control the automatic setting of the wiper plates. The scale may indicate different widths of shoes which are to be lasted and soled, and by the scale setting of the cam bars, the desired arrangement of the wiper plates will be accomplished.

Wiper plates of different longitudinal curvatures may be used, depending upon the shape of the shoe desired, but all of the wiper plates will be accurately held in place by virtue of the concentric concave and convex surfaces on the plates and their supporting pins 25 and securing screws 37 (Figure 16). Whatever the curvature or inclination of the wiper plates may be, the screws 37 will lock the plates rigidly in set position without any jamming thereof and so that the wiper plates may move relatively freely at their tongue and groove interlocking connections.

I have shown a practical and efficient embodiment of the various features of my invention, but I do not desire to be limited to the exact structures, arrangements and operation shown and described as changes and modifications may be made without departing from the scope of the invention.

I claim as follows:

1. In a lasting machine, a pair of heel wipers, a pair of toe wipers, a pair of side wipers carried at their ends on wipers of the other pairs and having guide channels near their ends, and tongues on the toe and heel wipers engaging in said channels.

2. In a lasting machine, a pair of heel wipers, a pair of toe wipers, a pair of side wipers carried at their ends on wipers of the other pairs and having cam channels near their ends, tongues extending from the heel and toe wipers into said channels, and retainer plates for holding said tongues in said channels.

3. In a lasting machine, a wiper assembly comprising a pair of toe wipers, a pair of heel wipers, a pair of side wipers, said side wipers having cam channels at their ends, tongues on the heel and toe wipers engaging in said channels, and retainer plates secured to said side wipers for retaining engagement of said tongues in said channels.

4. In a lasting machine, a pair of toe wipers, a pair of heel wipers, a pair of side wipers underlying said toe and heel wipers, said side wipers at their ends having cam grooves and said toe and heel wipers having tongues for receiving the respective grooves of the side wipers, and retainer plates for retaining the respective tongues in their grooves.

5. In a lasting machine, a base structure, supporting blocks movable longitudinally on said base structure toward and from each other, wiper pedestals shiftable on said supporting blocks transversely of said base structure, a set of toe wipers and a set of heel wipers mounted on said pedestals, a cam rail adjacent to each pedestal, said cam rails being adjustably mounted on said base structure, a cam roller frame secured to each pedestal, a cam roller in each frame engaging the inner side of the associated cam rail and an arm pivoted to each frame and supporting a cam roller engaging the outer side of the associated cam rail, said cam rails functioning to cause transverse relative movement of the toe and heel wiper supporting pedestals upon relative longitudinal movement thereof.

6. In a lasting machine, a wiper assembly comprising a pair of toe wipers, a pair of heel wipers, and a pair of side wipers underlying said toe and heel wipers, channel and tongue connections between said side wipers and the toe and heel wipers functioning to cause only transverse movement of the side wipers upon relative longitudinal movement of the toe and heel wipers, and thin flexible retainer plates overlying said wiper assembly and secured to said side wipers for operatively maintaining said channel and tongue connections.

7. In a lasting machine, a wiper assembly comprising a pair of toe wipers, a pair of heel wipers, and a pair of side wipers, said side wipers having cam channels at their ends, tongues on the heel and toe wipers engaging in said channels, and retainer plates secured to said side wipers for retaining engagement of said tongues in said channels, said channels gradually increasing in width inwardly whereby to prevent binding when the wiper assembly is contracted and expanded.

8. In a lasting machine, a wiper assembly comprising toe and heel wipers and means for contracting said assembly for lasting of an upper to a last block in the assembly, a heel jack for the last block and a toe rest therefor, and manually operable levers fulcrumed on said wiper assembly for lateral movement for engagement of their inner ends with the bottom of the last block and for vertical movement for forcing the last block against said jack and said toe rest whereby to align the last block relative to said wiper assembly for accurate wiping of the upper around the last block.

9. In a lasting machine, a wiper assembly comprising toe and heel wipers and means for contracting said assembly for lasting an upper to a last block in the assembly, a vertically adjustable toe support, manually operable levers fulcrumed intermediate their ends on said toe wipers for lateral movement for engagement of their inner ends with the bottom of the last block and for vertical movement for forcing the last block against said toe support whereby to align the last block relative to said toe support for accurate wiping of the toe part of the upper.

10. In a lasting machine, a wiper assembly comprising toe and heel wipers and means for contracting said assembly for lasting of an upper to a last block in the assembly, adjustable heel and toe supports for the last block, and levers fulcrumed on said wiper assembly and independently operable to apply pressure against the bottom of the last block for accurately seating the block on said supports preparatory to the wiping of the upper around the block.

11. In a lasting machine, a wiper assembly comprising toe and heel wipers and means for contracting said assembly for lasting of an upper to a last block in the assembly, an adjustable toe rest, and levers fulcrumed on said toe wipers and independently manually operable to apply pressure against the bottom of the toe of the last block for accurately seating the block and the upper thereon on said toe rest preparatory to the wiping of the upper around the block.

12. In a lasting machine, a wiper assembly for lasting uppers, a supporting structure extending longitudinally above the wiper assembly, a carriage on said supporting structure and a heated ironing head suspended therefrom, and means for reciprocating said carriage longitudinally along said supporting structure throughout the length of the wiper assembly for engagement of the ironing head with the marginal portion of an upper wiped to a last block by said wiper assembly.

13. In a lasting machine, a wiper assembly comprising toe wipers and heel wipers, a supporting structure for the toe wipers and a supporting structure for the heel wipers and means for adjusting said supporting structures toward or away from each other, a support movable with the supporting structure for the heel wipers, an arm on said support adapted to be extended above said wiper supporting structures, a carriage on said arm and an ironing head suspended therefrom, and means for shifting said carriage longitudinally along said arm for engagement of said ironing head with the marginal portion of an upper lasted by said wiper assembly.

14. In a lasting machine, a wiper assembly comprising toe wipers and heel wipers, a supporting structure for the toe wipers and a supporting structure for the heel wipers and means for adjusting said supporting structures toward or away from each other, a support movable with the supporting structure for the heel wipers, an arm on said support adapted to be extended above said wiper supporting structures, a carriage on said arm and an ironing head suspended therefrom, means for shifting said carriage longitudinally along said arm for engagement of said ironing head with the marginal portion of an upper lasted by said wiper assembly, and a rest for said arm on the toe wiper supporting structure, said rest being adjustable to define the path of movement of said ironing head.

15. In a lasting machine, a wiper assembly comprising toe wipers and heel wipers, means for effecting longitudinal and transverse expansion and contraction of said wiper assembly, and a heel block independent of said wiper assembly mounted to follow the longitudinal movement of said wiper assembly for engaging with the heel of an upper to be lasted to hold the heel of the upper against slipping up on the last block during the wiping operation.

16. In a lasting machine, supporting blocks movable longitudinally of the machine toward and away from each other, pedestals shiftable on said blocks transversely of the machine and supporting toe and heel wipers, and a heel block mounted on the supporting block for the heel wiper pedestals independently of the heel wipers to follow the movements of said block and to engage the heel of an upper to prevent upward slipping thereof on the last during the wiping operation.

17. In a lasting machine for lasting welted uppers against an insole, a wiper assembly comprising toe and heel wiper and side wiper structures movable by and with the toe and heel wipers, holding means mounted on said side wiper structures and each comprising a row of adjustable pins, and means for applying said pins to clamp the welt of the upper to the side wiper structures whereby said holding means will move with the welt while the welt is applied to the insole during the lasting of the upper by the wiper assembly.

18. In a lasting machine, a wiper carriage having a pair of posts for supporting a wiper plate, a wiper plate having seating portions for receiving said posts, and a bodily and rotatably adjustable arm on said carriage for supporting one of said posts.

19. In a lasting machine, a wiper carriage, a supporting post on said carriage having a spherical head, a wiper plate having a concave seating portion for receiving said post head, said wiper plate having another concave seating portion, a second post on said carriage having a spherical head for receiving said other seating portion, an arm on said carriage for supporting said second post, said arm being bodily and rotatably adjustable on said carriage for accurate alignment of the post head with said other seating portion of said plate.

20. In a lasting machine, a wiper assembly comprising a pair of toe wipers and a pair of heel wipers, a supporting pedestal for each wiper, an axially adjustable post on each pedestal for supporting one end of the respective wipers, a second axially adjustable post on each pedestal for supporting the respective wipers at another point, and a bodily and rotatably adjustable support on said pedestal for said other post for adjusting the angularity of the respective wipers relative to the other wipers.

21. In a lasting machine, a wiper assembly comprising a pair of toe wiper plates and a pair of heel wiper plates, a supporting pedestal for each wiper plate, each wiper plate having a pair of bearing recesses, a pair of posts on each pedestal and bearing heads on said posts for engaging in said bearing recesses of the respective wiper plates, each post being axially adjustable, and means for effecting relative bodily adjustment of said posts for lateral adjustment of the supported wiper plates.

22. In an ironing machine, a wiper assembly for lasting uppers, a supporting structure pivoted on the machine and adapted to be swung into operative position, means for latching the support in operative position, a carriage on said support, an ironing head suspended from said carriage, and means for reciprocating said carriage on said support for ironing engagement of the ironing head with the marginal portions of the uppers.

23. In a lasting machine, a wiper assembly for lasting uppers, a supporting bar pivoted at the rear end of the machine and adapted to be swung forwardly to extend longitudinally over the wiper assembly, means for latching said bar at its forward end, a carriage on said bar, an ironing head depending from said carriage, means for shifting said carriage on said bar for ironing engagement of the ironing head with the marginal portion of an upper, and means for adjusting the ironing pressure of said ironing head.

24. An ironing machine comprising a wiper assembly for lasting uppers, an ironing head supporting carriage, an ironing head shiftable on said carriage for ironing engagement with the marginal portion of an upper, and a yieldable tongue on said ironing head for engaging and holding the heel of the upper during ironing of the marginal portion of the heel of the upper by the ironing head.

25. A lasting machine comprising a wiper assembly and setting means therefor, an ironing structure comprising a supporting frame and an ironing head shiftable thereon for ironing engagement with the marginal portion of a lasted upper within the wiper assembly, and a yieldable abutment on said ironing head engageable with the corner of the heel of an upper while the ironing head body continues in ironing engagement with the marginal portion of the heel of the upper.

26. An ironing machine comprising a wiper assembly and setting means therefor, an ironing structure comprising a supporting frame on the machine and an ironing head shiftable on said frame for ironing engagement with the marginal portion of a lasted upper within the wiper assembly, a tongue projecting a bit beyond the end of the ironing head, spring means tending to hold the tongue projected, said tongue having a contour for fitting into the corner of the heel and serving to engage with and hold the heel smooth while the ironing head irons the heel marginal portion.

27. In a lasting machine for lasting a welted upper and aligning the upper for reception of a sole, a wiper assembly comprising toe and heel wipers and side wipers, holding means bodily movable with said side wipers for holding the welt of the upper against the outer face of said wipers for movement of the welt with the wipers as the wiper assembly draws the upper around the last.

28. In a lasting machine, a wiper assembly comprising toe and heel wipers and side wipers relatively adjustable for defining a last receiving opening, supports for the side wipers, a holding structure mounted on each of said supports and each comprising a row of adjustable pins arranged for engagement with the sole receiving portion of an upper within the wiper assembly to clamp said portion against the top faces of side wipers, said support and holding structures being movable with said side wipers whereby said clamped portion will move with said side wipers as the upper is drawn around the last by the wiper assembly.

29. In a lasting and sole applying machine, the combination of supporting means for supporting a last and its upper with their bottoms up, a wiper assembly comprising laterally moving wiper elements, holding means for engaging with the sole receiving portion of the upper overlying said wiper elements and for clamping said portion against the top faces of said wiper elements, said holding means being arranged to follow the movement of said wiper elements whereby said clamped sole receiving portion will move with the wiper elements as said elements are moved toward each other to draw the upper around the last.

30. In a lasting and sole applying machine, the combination of supporting means for supporting a last and its uppers with their bottoms up, a wiper assembly comprising laterally moving wiper elements, holding means on opposite sides of the last and uppers each comprising a row of adjustable vertical pins, means for adjusting said holding means to apply said pins downwardly against the sole receiving portion of the upper overlying the wiper elements to clamp said portion down against the upper sides of the wiper elements, means supporting said holding means for movement thereof with said wiper elements so that said pins and sole receiving portions clamped thereby will move with said wiper elements as said wiper elements are moved laterally toward each other to draw the upper body around the last.

JOSEPH W. BARNA.